(12) United States Patent
Ohba et al.

(10) Patent No.: US 8,331,701 B2
(45) Date of Patent: Dec. 11, 2012

(54) IMAGE PROCESSING DEVICE FOR DISPLAYING AN IMAGE ON A DISPLAY

(75) Inventors: Akio Ohba, Kanagawa (JP); Hiroyuki Segawa, Kanagawa (JP); Tetsugo Inada, Kanagawa (JP); Hirotoshi Maegawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 651 days.

(21) Appl. No.: 12/537,316

(22) Filed: Aug. 7, 2009

(65) Prior Publication Data

US 2010/0040297 A1   Feb. 18, 2010

(30) Foreign Application Priority Data

Aug. 12, 2008 (JP) ................................. 2008-207619
Jun. 8, 2009 (JP) ................................. 2009-136896

(51) Int. Cl.
*G06K 9/36* (2006.01)
*G09G 5/00* (2006.01)
*G06K 9/46* (2006.01)

(52) U.S. Cl. ........................................ 382/232; 345/619
(58) Field of Classification Search .................. 382/232, 382/233, 235, 254, 260–264, 269, 298, 299, 382/305; 358/432, 447, 448; 345/619, 698; 375/240.01

See application file for complete search history.

(56) References Cited

U.S. PATENT DOCUMENTS

| | | | | |
|---|---|---|---|---|
| 5,519,852 A * | 5/1996 | Noy | .............................. | 703/27 |
| 5,694,316 A * | 12/1997 | Azancot | ........................ | 382/232 |
| 5,835,637 A * | 11/1998 | Houchin et al. | ............. | 382/254 |
| 6,014,468 A * | 1/2000 | McCarthy et al. | ............ | 382/254 |
| 6,563,999 B1 | 5/2003 | Suzuoki | | |
| 6,996,278 B2 * | 2/2006 | Ohyama et al. | ............... | 382/232 |
| 2003/0222895 A1 * | 12/2003 | Arai | ............................. | 345/698 |
| 2006/0133690 A1 * | 6/2006 | Bloomberg et al. | .......... | 382/269 |
| 2010/0040297 A1 * | 2/2010 | Ohba et al. | ................... | 382/232 |

* cited by examiner

*Primary Examiner* — Amir Alavi
(74) *Attorney, Agent, or Firm* — Matthew B. Dernier, Esq.; Gibson & Dernier LLP

(57) ABSTRACT

A compression format identifying unit identifies the compression format of image data stored in a main memory. A transfer function determining unit determines a transfer function in accordance with the compression format of a tile image thus identified. A convolution operation unit subjects a modification request signal and the transfer function thus determined to convolution operation so as to generate a modification direction signal. A read ahead processor reads a tile image from the main memory using the modification request signal, decodes the image, and writes the decoded image in a buffer memory. A display image processor generates a display image using the modification direction signal.

7 Claims, 12 Drawing Sheets

IMAGE PROCESSING DEVICE FOR DISPLAYING AN IMAGE ON A DISPLAY

BACKGROUND OF THE INVENTION

1. Field of the Invention

The present invention relates to an image processing technology for enlarging/reducing an image displayed on a display, or moving the image vertically or horizontally.

2. Description of the Related Art

Home entertainment systems are proposed in which not only a game program can be run but also moving images can be played back. In this home entertainment system, a graphic processing unit (GPU) generates three-dimensional images in which polygons are used.

[patent document No. 1] U.S. Pat. No. 6,563,999

In the related art, there is proposed a technology for enlarging/reducing a display image or moving the image vertically or horizontally using tile images at a plurality of resolutions generated from digital images such as high-definition photographs. According to such an image processing technology, images at a plurality of resolutions are generated by reducing an original image in size in a plurality of stages, dividing the image in each layer into one or a plurality of tile images, so as to represent the original image using a hierarchical structure. Normally, the image at the lowest resolution comprises a single tile image. The original image, which has the highest resolution, comprises the largest number of tile images. The image processing device is adapted to enlarge or reduce a display image efficiently by switching a tile image currently used to a tile image in a different layer.

In such an image processing device, the display image may not be smoothly enlarged or reduced at the time of switching the tile image. A similar situation may occur when the display image is moved vertically or horizontally, i.e. the display image may not be moved smoothly when tile image located in the direction of movement is switched into use. When display images are not modified continuously, the user may feel uncomfortable.

SUMMARY OF THE INVENTION

In this background, a purpose of the present invention is to provide a technology capable of modifying a display image smoothly in accordance with a request to modify the image from a user.

In order to address the aforementioned problem, an image processing device for displaying an image on a display comprises: a storage device operative to store image data including at least one compressed tile image for each of different resolutions; an identifying unit operative to identify the compression format of the image data stored in the storage device; a transfer function determining unit operative to determine a transfer function in accordance with the compression format of the tile image thus identified; an acknowledging unit operative to acknowledge a modification request signal requesting modification of a display image displayed on the display; a convolution operation unit operative to subject the modification request signal and the transfer function thus determined to convolution operation so as to generate a modification direction signal; a read ahead processor operative to read a tile image from the storage device using the modification request signal and decode the image thus read; and a display image processor operative to generate a display image using the modification direction signal.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
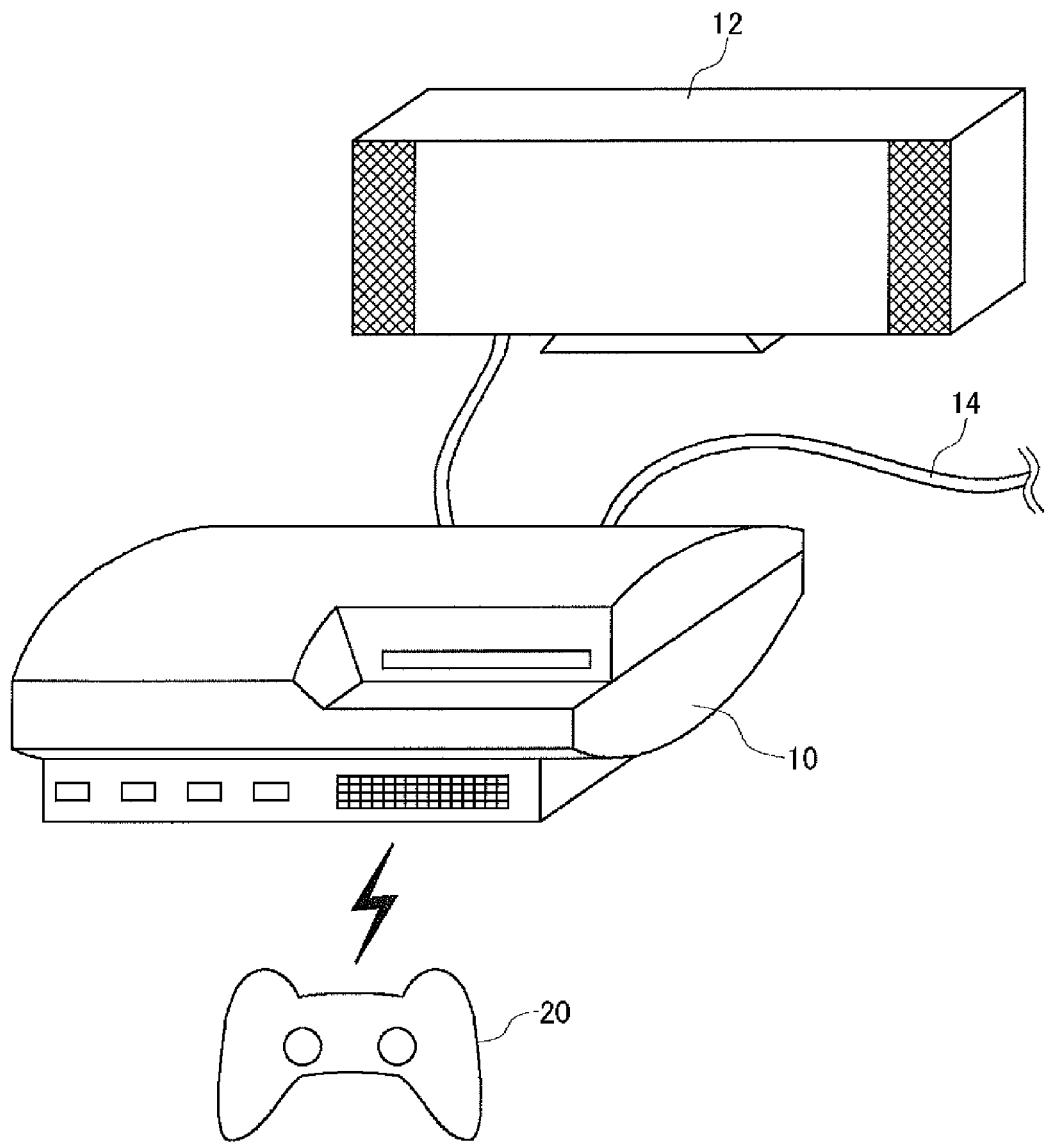
FIG. 1 shows an environment in which the image processing system according to an embodiment of the present invention is used.

The invention will now be described by reference to the preferred embodiments. This does not intend to limit the scope of the present invention, but to exemplify the invention. FIG. 1 shows an environment in which an image processing system 1 according to an embodiment of the present invention is used. The image processing system 1 comprises an input device 20, an image processing device 10 for executing image processing software, and a display device 12 for outputting a result of processing by the image processing device 10. The display device 12 may be a television set provided with a display for outputting images and with a speaker for outputting sound. The display device 12 may be a computer display. The display device 12 may be connected by cable to the image processing device 10 or wirelessly connected thereto via a wireless local area network (LAN). The image processing device 10, the input device 20, and the display device 12 may be formed as one unit. For example, the device 10, etc. may be formed as a mobile terminal provided with an image processing function.

The image processing device 10 of the image processing system 1 may be connected to an external network such as the Internet via a cable 14 and may be adapted to download and retrieve hierarchized compressed image data. The image processing device 10 may be connected to an external network using wireless communication.

For example, the image processing device 10 may be a game device and may achieve the image processing function by loading an image processing application program into the device. The image processing device 10 may be a personal computer and may achieve the image processing function by loading an image processing application program into the computer.

The image processing device 10 performs processes for modifying a display image in response to a request entered by a user in the input device 20. For example, the device 10 enlarges or reduces an image displayed on the display device 12 or move the image up, down, leftward, or rightward (i.e., in the vertical or horizontal direction). As the user operates the input device 20 while viewing the image displayed on the display, the input device 20 transmits a signal requesting modification of a display image to the image processing device 10.

Figure 2:
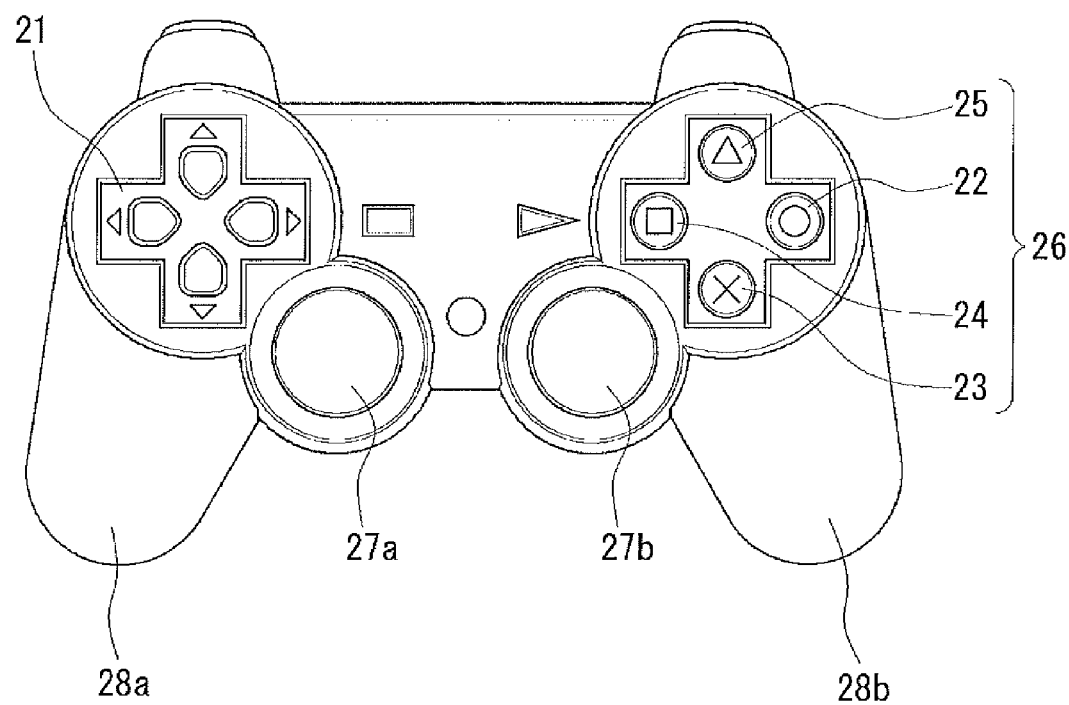
FIG. 2 shows the appearance of the input device.

FIG. 2 shows the appearance of the input device 20. The input device 20 is formed as a control means that can be manipulated by the user and comprises a directional key 21, analog sticks 27a and 27b, and four control buttons 26. The four control buttons 26 include a circular button 22, a × button 23, a square button 24, and a triangular button 25.

In the image processing system 1, the control means of the input device 20 is assigned the function of entering a request for enlarging or reducing a display image, and a request for scrolling the image in the vertical or horizontal direction. For example, the function of entering a request for enlarging or reducing a display image is assigned to the right analog stick 27b. The user can enter a request for reducing a display image by pulling the analog stick 27b toward the user or enter a request for enlarging a display image by pressing the stick away from the user. The function of entering a request for scrolling a display image is assigned to the directional key 21. By pressing the directional key 21, the user can request scrolling in the direction in which the directional key 21 is pressed. The function of entering a request for modification of an image may be assigned to another control means. For example, the function of entering a request for scrolling may be assigned to the analog stick 27a.

The input device 20 has the function of transferring an image modification request signal entered to the image processing device 10. In this embodiment, the input device 20 is configured to be wirelessly communicable with the image processing device 10. Wireless connection may be established between the input device 20 and the image processing device 10 using the Bluetooth (registered trademark) protocol or the IEEE802.11 protocol. The input device 20 may be connected to the image processing device 10 by cable to transfer an image modification request signal to the image processing device 10.

Figure 3:
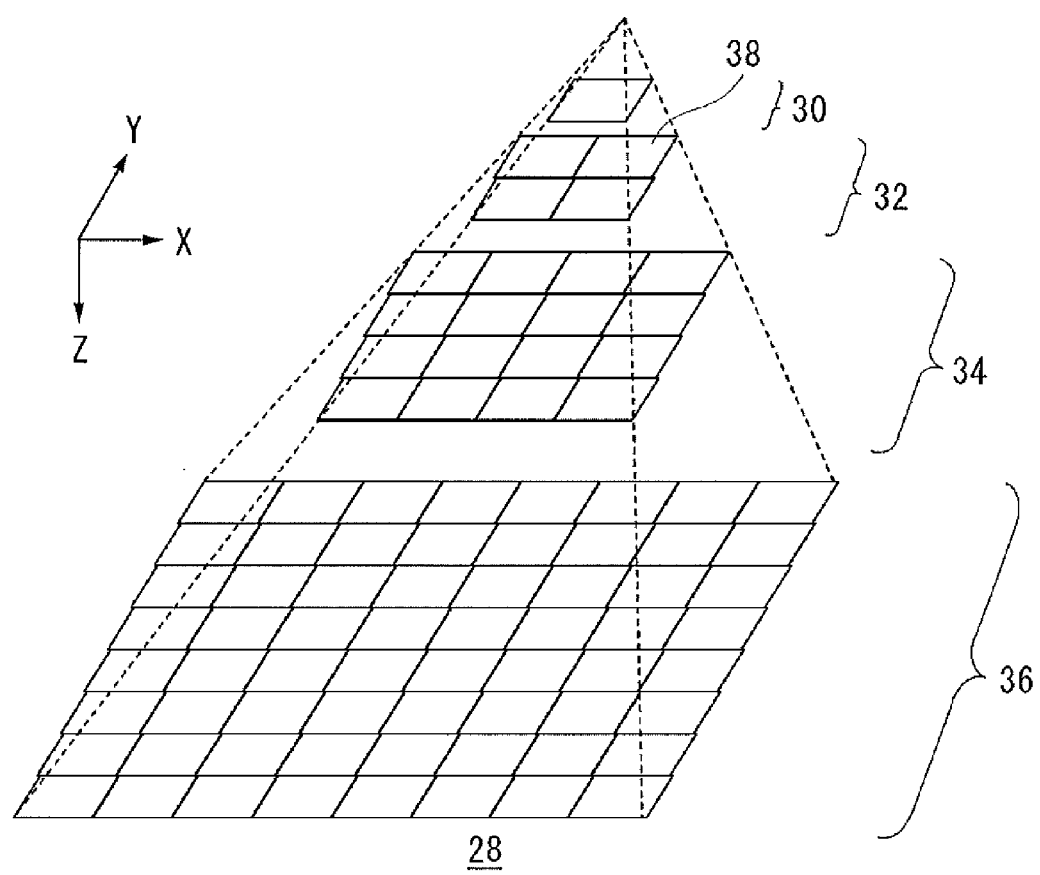
FIG. 3 shows the hierarchical structure of image data used in the image processing system.

FIG. 3 shows the hierarchical structure of image data used in the image processing system 1. The image data has a hierarchical structure including a 0-th layer 30, a first layer 32, a second layer 34, and a third layer 36 in the depth (Z axis) direction. Hereinafter, image data having the hierarchical structure as illustrated will be referred to as "hierarchical data". Layers higher than the fourth layer may be provided. The hierarchical data 28 shown in FIG. 3 has a quadtree hierarchical structure. Each layer comprises one or more tile images 38. All of the tile images 38 are formed to have the same size and include the same number of pixels. For example, a tile image has 256×256 pixels. Image data in the layers are representations of a single image in different resolutions. The original image in the third layer 36 having the maximum resolution is reduced in size in a plurality of stages so as to generate image data in the second layer 34, the first layer 32, and the 0-th layer 30. For example, the resolution in the N-th layer, where N denotes an integer equal to or greater 0, may be half the resolution of the (N+1)th layer both in the horizontal (X axis) direction and in the vertical (Y axis) direction.

The hierarchical data 28 is compressed in a predetermined compression format for storage in the storage device of the image processing device 10. The data is read from the storage device and decoded before being displayed on the display. The image processing device 10 according to the embodiment is provided with the decoding function compatible with a plurality of compression formats. For example, the device is capable of decoding compressed data in the S3TC format, JPEG format, and JPEG2000 format. Time required for expanding images of the same size through a decoding process is the shortest in the case of image data compressed in the S3TC format, followed by the JPEG format and the JPEG200 format in the stated order. Compression may be performed in units of tile images forming the hierarchical data. Alternatively, a plurality of tile images in the same layer may be processed concurrently.

The hierarchical structure of the hierarchical data 28 is built as a virtual three-dimensional space such that the horizontal direction is defined as the X axis, the vertical direction is defined as the Y axis, and the depth direction is defined as the Z axis. In this hierarchical structure, the X axis and the Y axis define a common coordinate system having the same origin. The image processing device 10 derives the amount by which a display image should be modified by referring to the input signal supplied from the input device 20 and uses the amount thus derived to derive coordinates (frame coordinates) at the four corners of a frame image in the virtual space. The frame coordinates in the virtual space are used in a read ahead process and a process of generating a display image described later. Instead of frame coordinates in the virtual space, the image processing device 10 may derive information specifying the layer and texture coordinates (UV coordinates) in the layer. Alternatively, the device 10 may derive the coordinates (X, Y) of the center of the frame image in the virtual space and the scale SCALE. For example, assuming that a control request from the user is a request to move a virtual camera in the hierarchical structure of the hierarchical data 28, the combination of the coordinates of the center of the frame image and the scale information (X, Y, SCALE) may be referred to as virtual camera image coordinates. For brevity, (X, Y, SCALE) will be hereinafter referred to as virtual camera image coordinates. An image modification request signal may be represented as a signal for specifying the virtual camera image coordinates (X, Y, SCALE) for each frame. The scale SCALE may be defined as the scale of the frame image given that the scale of a display image in L3 is 1, as described later. The scale may be defined as the scale X_SCALE in the X-axis direction and the scale Y_SCALE in the Y-axis direction. An aspect ratio may be modifiable by using different values for X_SCALE and Y_SCALE. In that case, the image virtual camera image coordinates may be represented as (X, Y, X_SCALE, Y_SCALE).

Figure 4:
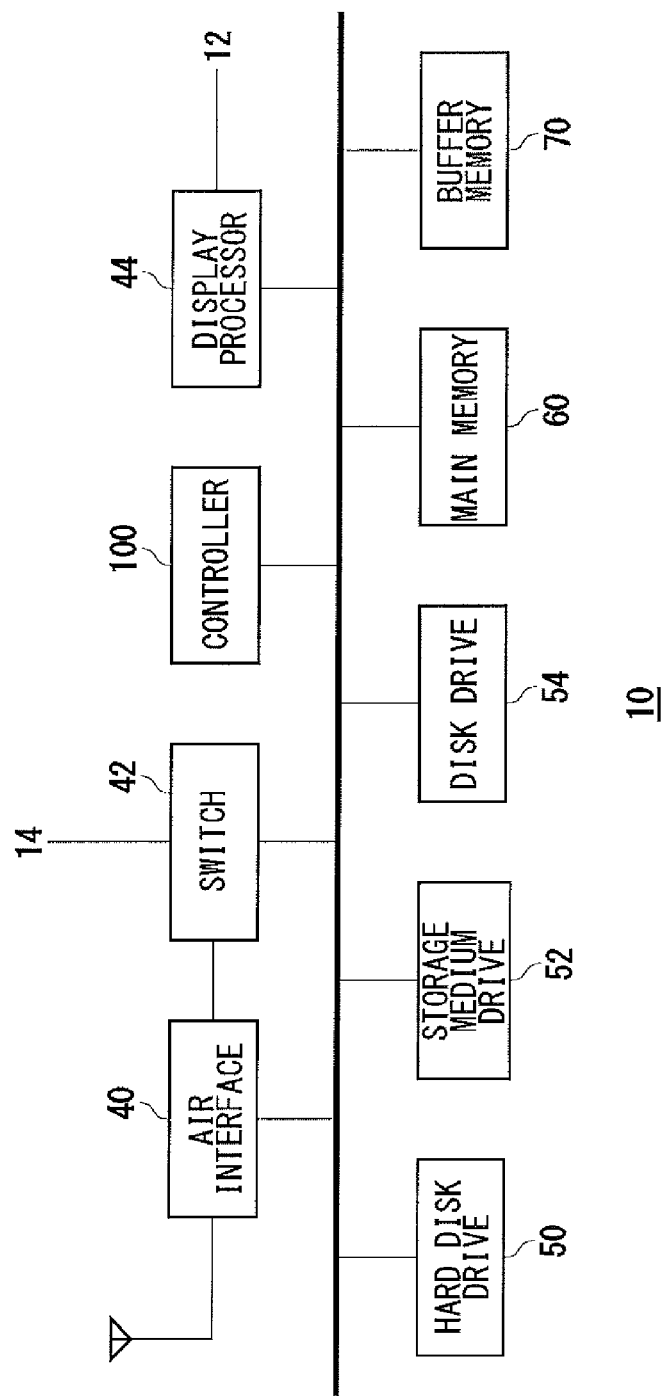
FIG. 4 is a functional block diagram of the image processing device.

FIG. 4 is a functional block diagram of the image processing device 10. The image processing device 10 comprises an air interface 40, a switch 42, a display processor 44, a hard disk drive 50, a recording medium drive 52, a disk drive 54, a main memory 60, a buffer memory 70, and a controller 100. The display processor 44 has a frame memory for buffering data displayed on the display device 12.

The switch 42 is an Ethernet switch (Ethernet is a registered trademark) and is a device connected to an external device by cable or wirelessly for transmission and reception of data. The switch 42 may be connected to an external network by a cable 14 to receive hierarchical compressed image data from an image server. The switch 42 is connected to the air interface 40. The air interface 40 is connected to the input device 20 using a predetermined wireless communication protocol. An image modification request signal entered by the user via the input device 20 is supplied to the controller 100 via the air interface 40 and the switch 42.

The hard disk drive 50 functions as an auxiliary storage device for storing data. The compressed image data received by the switch 42 may be stored in the hard disk drive 50. When a display process is performed, the compressed image data stored in the hard disk drive 50 is read into the main memory 60. The recording medium drive 52 reads data from a removable recording medium such as a memory card when the medium is mounted on the unit. The disk drive 54 drives and recognizes a read-only ROM disk when it is mounted and reads data accordingly. A ROM disk may be an optical disk or a magneto-optical disk.

The controller 100 is provided with a multicore CPU. One general-purpose processor core and a plurality of simple processor cores are provided in a single CPU. The general-purpose processor core is referred to as a power processing unit (PPU) and the remaining processor cores are referred to as synergistic-processing units (SPU).

The controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70. The main memory 60 and the buffer memory 70 are storage devices and are configured as random access memories (RAM). The SPU is provided with a dedicated direct memory access (DMA) controller as a control unit. As such, the SPU is capable of transferring data between the main memory 60 and the buffer memory 70 at a high speed and transferring data between the frame memory in the display processor 44 and the buffer memory 70 at a high speed. The controller 100 according to the embodiment achieves high-speed image processing functions by operating a plurality of SPUs in parallel. The display processor 44 is connected to the display device 12 and outputs a result of image processing in accordance with a request from the user.

In order to modify a display image smoothly in performing processes of enlarging, reducing, or scrolling a display image, the image processing device 10 according to the embodiment refers to a request for modifying an image from the user to predict a tile image 38 displayed in the future, decodes the tile image 38 from the hierarchical data stored in the storage device, and expands the data in the buffer memory 70. In this way, the device can instantly switch, when it becomes necessary later, to the tile image 38 used to generate a display image. Hereinafter, the process of predicting a tile image displayed in the future and expanding the image in the buffer memory 70 ahead of time will be referred to as a "read ahead" process.

Figure 5:
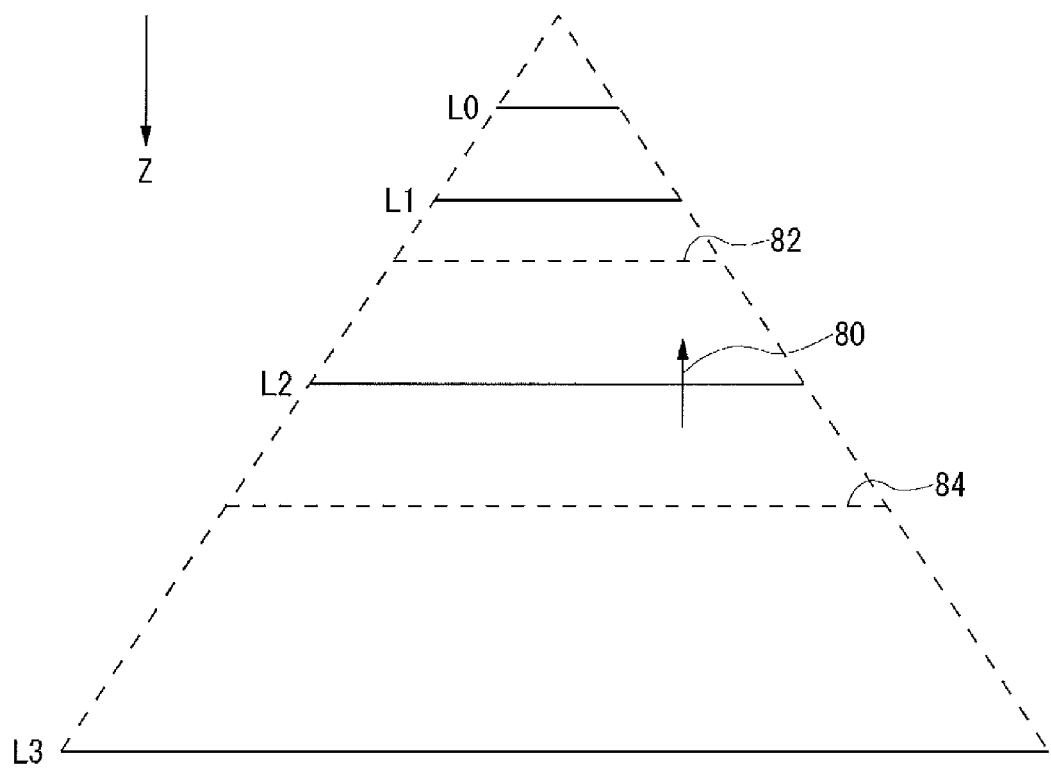
FIG. 5 is a diagram illustrating a read ahead process.

FIG. 5 is a diagram illustrating a read ahead process. FIG. 5 shows the structure of hierarchical data. The layers are referred to as L0 (0-th layer), L1 (first layer), L2 (second layer), and L3 (third layer). Referring to the hierarchical data structure shown in FIG. 5, the position in the depth direction (Z axis) indicates the resolution. The closer the position to L0, the lower the resolution; and the closer the position to L3, the higher the resolution. As regards the size of an image as displayed on the display, the position in the depth direction is associated with the scale. Given that the scale of a display image of L3 is 1, the scale of L2 is ¼, the scale of L1 is ¹⁄₁₆, and the scale of L0 is ¹⁄₆₄. Therefore, as the display image changes in the direction from L0 to L3, the display image is enlarged. As the image changes in the direction from L3 to L0, the display image is reduced. An arrow 80 indicates that the image modification request signal from the user requests reduction of the display image and that the scale ¼ (L2) is exceeded. The image processing device 10 according to the embodiment sets the position in the direction of L1 and L2, which comprises associated tile images 38, as a read ahead boundary in the depth direction. When an image modification request signal goes past the read ahead boundary, the read ahead process is initiated.

When the scale of a display image is in the vicinity of L2, the display image is generated using the tile image in L2 (second layer). More specifically, when the scale of an image to be displayed is between a switching boundary 82 between the L1 tile images and the L2 tile images, and a switching boundary 84 between the L2 tile images and the L3 tile images, an L2 tile image is used. Accordingly, when reduction of an image is requested as indicated by the arrow 80, an enlarged L2 tile image is converted into a reduced image and displayed. The image processing device 10 according to the embodiment subjects the image modification request signal from the input device 20 and a transfer function to convolution operation, thereby delaying the generation of display image as requested by the image modification request signal. While the generation of an image is being delayed, the device 10 identifies a tile image 38 predicted to be necessary in the future by referring to the image modification request signal and reads the image 38 from the storage device ahead of time. In the example of FIG. 5, when the image modification request signal requests a scale that goes past L2, the image processing device 10 reads the corresponding tile image 38 of L1 located in the direction of size reduction ahead of time. The device 10 decodes the image thus read and writes the decoded image in the buffer memory 70. For brevity, it is assumed in this embodiment that the image modification request signal is fed from the input device 20. Alternatively, the image modification request signal may be derived from converting, in the image processing device 10, the input signal from the input device 20 into virtual camera image coordinates (X, Y, SCALE) for each frame.

The description above concerns a read ahead process in the depth direction. A read ahead process in the vertical and horizontal directions will be performed similarly. More specifically, a read ahead boundary is set in the image data expanded in the buffer memory 70. When the displayed position as designated by the image modification request signal goes past the read ahead boundary, the read ahead process is initiated.

Figure 6:
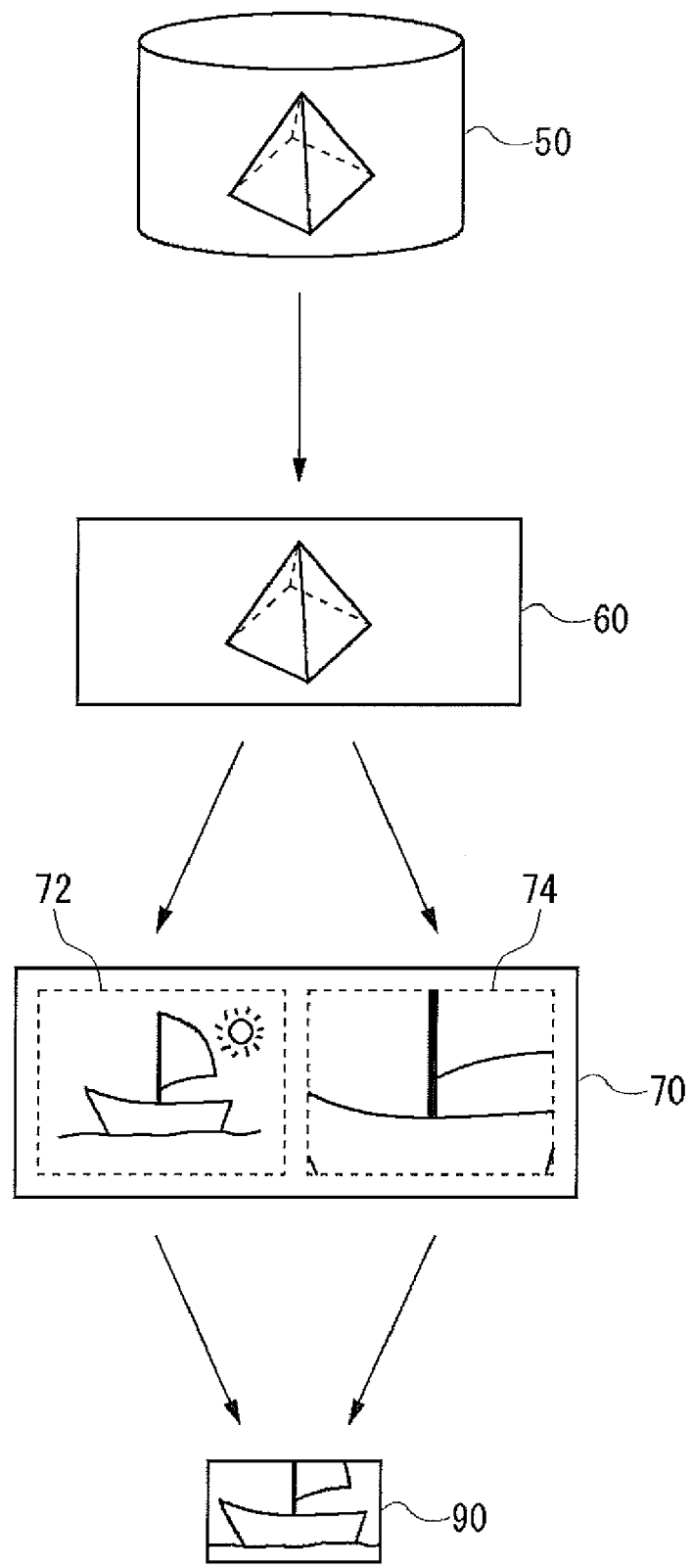
FIG. 6 shows the flow of processing image data.

FIG. 6 shows the flow of processing image data. For example, the hierarchical data is compressed and stored in the hard disk drive 50 connected via an external network. The hierarchical data may be stored in an external storage device such as a memory card. Alternatively, the data may be stored in a disk storage device such as a ROM.

Prior to image processing, the hierarchical data stored in the hard disk drive 50 is read into the main memory 60, remaining as compressed data. The entirety of the hierarchical data of the hierarchical structure may be read into the main memory 60. Alternatively, part of the hierarchical data may be read. For example, tile images in the vicinity of the tile image used to generate the display image may be read into the main memory 60 in a compressed state. As mentioned before, the controller 100 according to the embodiment is capable of operating a plurality of SPUs in parallel. Therefore, the hierarchical data maintained in the main memory 60 in a compressed state can be decoded as needed in a short period of time. This eliminates the need to make decoded image data available in the main memory 60 so that the capacity of the main memory 60 can be reduced.

The image processing device 10 performs image processing and displays an initial image on the display. Upon receipt of an image modification request signal from the input device 20, the image processing device 10 reads the tile image 38 that will be necessary in the future into the main memory 60 ahead of time. The device 10 decodes the image thus read and writes the decoded image in the buffer memory 70.

The buffer memory 70 comprises at least two buffer areas 72 and 74. Each of the buffer areas 72 and 74 is configured to be larger than a frame memory 90 in size. When a scroll request signal or a signal requesting enlarging or reducing an image is fed from the input device 20, the image data expanded in the buffer areas 72 and 74 may be used to generate a display image to address the request to some degree.

One of the buffer areas 72 and 74 is used to store the tile image 38 used to generate the display image. The other is used in a read ahead process for reading hierarchical data ahead of time to prepare the tile image 38 that will be necessary in the future. Referring to FIG. 5, when the requested scale of the display image goes below L2 in the depth direction, the read ahead process of reading the L1 tile image ahead of time is started. The read ahead process is completed before the requested scale goes past the switching boundary 82 so that the decoded tile image 38 is stored in the buffer area 72 or 74. In this way, the device is capable of switching to the tile necessary tile image 38 when the requested scale reaches the switching boundary 82. Thereby, the display image can be displayed smoothly.

Figure 7:
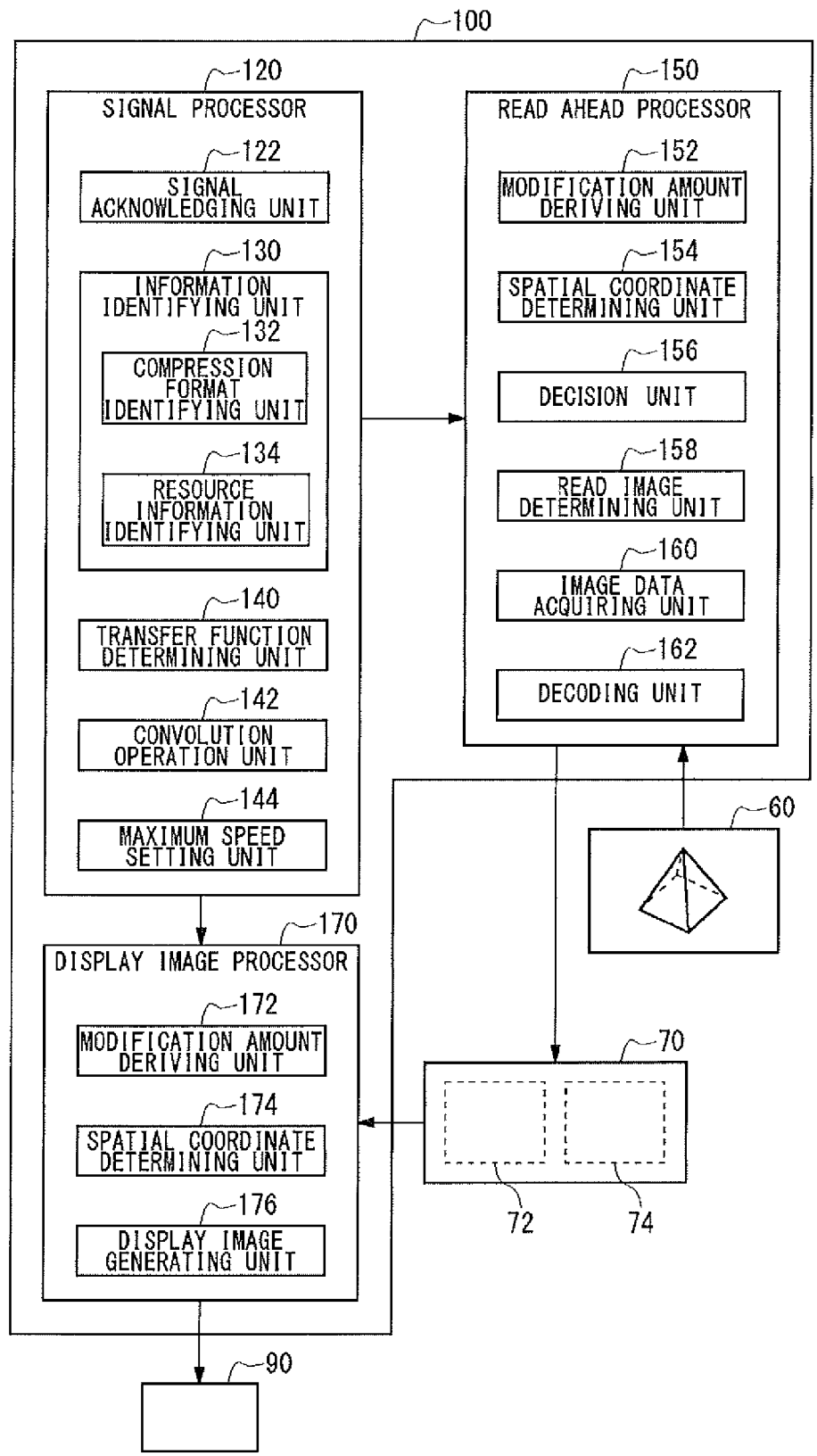
FIG. 7 shows the structure of the image processing device.

FIG. 7 shows the structure of the image processing device 10. The image processing device 10 comprises a signal processor 120, a read ahead processor 150, and a display image processor 170. The signal processor 120 is provided with a signal acknowledging unit 122, an information identifying unit 130, a transfer function determining unit 140, a convolution operation unit 142, and a maximum speed setting unit 144. The information identifying unit 130 is provided with a compression format identifying unit 132 and a resource information identifying unit 134. The signal processor 120 processes an image modification request signal supplied from the input device 20. The read ahead processor 150 is provided with a modification amount deriving unit 152, a spatial coordinate determining unit 154, a decision unit 156, a read image determining unit 158, an image data acquiring unit 160, and a decoding unit 162. The read ahead processor 150 reads and decodes the tile image 38 that will be necessary in the future before the display image processor 170 generates a display image. The display image processor 170 is provided with a modification amount deriving unit 172, a spatial coordinate determining unit 174, and a display image generating unit 176. The display image processor 170 generates a display image using the image data decoded by the read ahead processor 150.

The elements depicted in FIG. 7 as functional blocks for performing various processes are implemented in hardware by central processing units (CPUs), memories, or other LSI's, and in software by a program etc. loaded into the memory. As mentioned before, the controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination of thereof. Particularly of note is the fact that the image processing device 10 is capable of decoding the tile image 38, needed in the future to generate a display image, in a short period of time because the plurality of SPUs function in coordination as the decoding unit 162.

Prior to the operation of the read ahead processor 150 and the display image processor 170, the signal processor 120 in the image processing device 10 sets the maximum value of the speed at which the display image is modified, and also determines a transfer function subject to convolution operation along with an image modification request signal. For example, a transfer function may be a Gaussian function. An image modification request signal is delayed by being subject to convolution operation along with the transfer function thus determined. The image processing device 10 uses the delay time to secure time required to read image data ahead in time. This will enable smooth image display adapted to the user request. Determination of a transfer function and setting of the maximum modification speed are performed based on information determined by the information identifying unit 130.

The compression format identifying unit 132 identifies the compression format of the image data stored in the main memory 60. The compression format identifying unit 132 identifies the compression format of the image data by referring to the extension of the image data and/or the header information in the image format. When the decoding unit 162 is capable of decoding image data compressed in the S3TC format, JPEG format, and JPEG200 format, the compression format identifying unit 132 identifies which of the formats is used to compress the image data.

As mentioned before, time required to decode data is shortest in the case of the S3TC format, followed by JPEG and JPEG2000. Therefore, when the image data is decoded in the S3TC format, the tile image 38 can be decoded in a shorter period of time than the other compression formats so that time required to read ahead is reduced and the modification speed of the display image can be set to a high value.

The maximum speed setting unit 144 sets the maximum value of the speed with which to modify a display image in accordance with the compression format of the image data identified by the compression format identifying unit 132. The maximum speed is the maximum value of the speed with which a display image is modified in one frame. The modification speed of a display image corresponds to the speed of moving a virtual camera. More specifically, the maximum speed setting unit 144 sets the maximum speed to V1 for image data in the S3TC format, to V2 for image data in the JPEG format, and to V3 for image data in the JPEG2000 format (in this case, V1>V2>V3). The maximum speed setting unit 144 also sets the maximum speed of enlarging an image, the maximum speed of reducing an image, and the maximum speed of scrolling an image in the vertical or horizontal direction. These maximum speeds may be appropriately determined according to the scale of a display image. As mentioned before, the maximum speed is set such that the longer the period of time for decoding required by the compression format, the lower the speed.

The transfer function determining unit 140 determines a transfer function used in convolution operation in accordance with the compression format of the image data identified by the compression format identifying unit 132. The transfer function substantially defines the delay time elapsed since an image modification request signal is acknowledged by the signal acknowledging unit 122 until the image is actually displayed. The transfer function determining unit 140 may select a transfer function from a plurality of Gaussian functions having different peak values.

Figure 8:
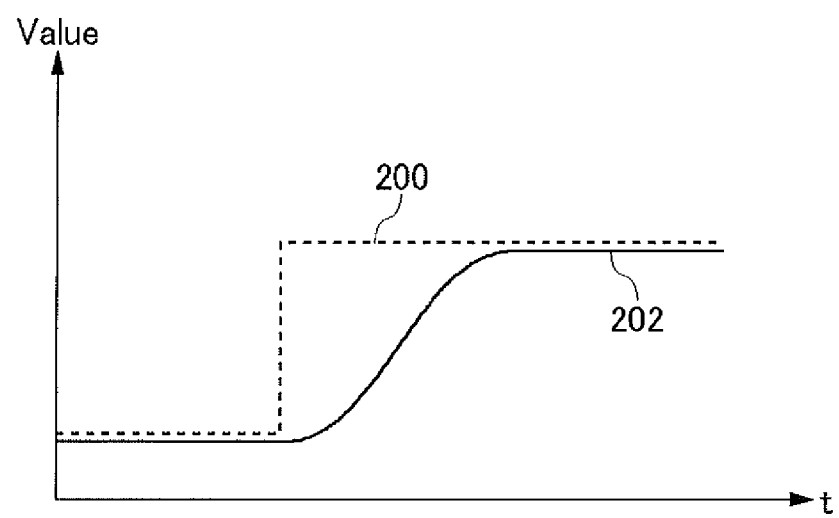
FIG. 8 shows how an image modification request signal and an image modification direction signal are related.

FIG. 8 shows an image modification request signal 200 corresponding to a request for moving a virtual camera and an image modification direction signal 202 obtained as a result of subjecting the signal 200 to convolution operation. FIG. 8 shows the image modification request signal 200 as a rectangular signal by way of example. The transfer function determining unit 140 determines a transfer function. The convolution operation unit 142 subjects the input image modification request signal 200 and the transfer function thus determined to convolution operation so as to generate an image modification direction signal 202. As shown in FIG. 8, the image modification direction signal 202 is delayed with respect to the image modification request signal 200 as a result of convolution operation. In the image processing device 10, the hierarchical data is defined in a single local coordinate system common to all layers. Therefore, even if the layer of the tile image 38 used for display is switched, the movement of the virtual camera takes place in a single coordinate system so that the continuity of the image modification request signal 200 for identifying virtual camera image coordinates (X, Y, SCALE) is secured. The image processing device 10 according to the embodiment secures time for a read ahead operation by delaying the image modification request signal 200 by subjecting the signal 20 and a transfer function to convolution operation.

Figure 9:
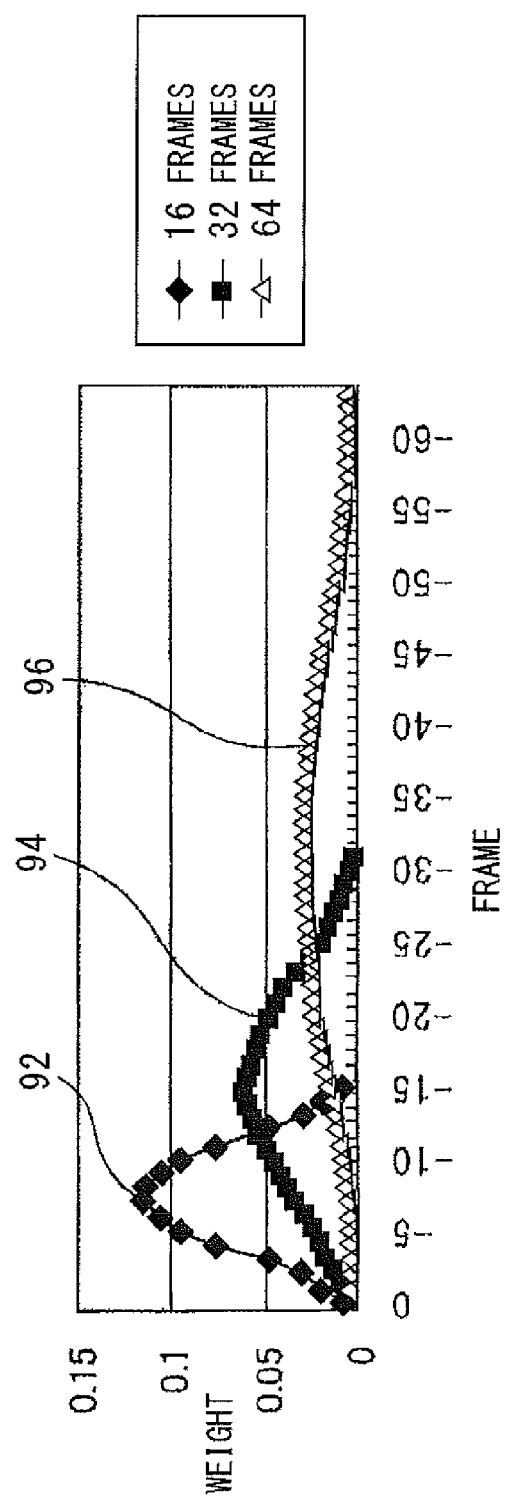
FIG. 9 shows three Gaussian functions.

FIG. 9 shows three Gaussian functions. FIG. 9 plots the weight of a function curve in the vertical axis and plots the number of frames in the horizontal axis. The duration of one frame is 1/60 second. A Gaussian function 92 has a width of 16 frames where the peak occurs in the 8th frame. A Gaussian function 94 has a width of 32 frames where the peak occurs in the 16th frame. A Gaussian function 96 has a width of 64 frames where the peak occurs in the 32th frame.

Given that the amount of control remains constant while the user is operating the control means of the input device 20, the input device 20 continues to output an image modification request signal as a rectangular signal. Therefore, a convolution operation on the image modification request signal and the Gaussian function 92 results in a signal that rises progressively since the input of the image modification request signal and that maintains a peak value from the 8th frame on. When the user stops using the control means so that the output of the image modification request signal is terminated, the result of convolution operation drops progressively since the point of time of termination of the image modification request signal and reaches zero in the 8th frame since the termination. Similarly, a convolution operation on the image modification request signal and the Gaussian function 96 results in a signal that rises gradually since the input of the image modification request signal and that maintains a peak value from the 32th frame on. When the user stops using the means so that the output of the image modification request signal is terminated, the result of convolution operation drops gradually since the point of time of termination of the image modification request signal and reaches zero in the 32th frame since the termination. Thus, a convolution result producing a longer delay time than that of the Gaussian function 92 can be obtained by using the Gaussian function 96.

Given that the three Gaussian functions shown in FIG. 9 are prepared as transfer functions in the hard disk drive 50, the transfer function determining unit 140 determines the Gaussian function 92 as a transfer function for image data in the S3TC format, determines the Gaussian function 94 as a transfer function for image data in the JPEG format, and determines the Gaussian function 96 as a transfer function for image data in the JPEG2000 format. Thus, the transfer function determining unit 140 secures time for a read ahead process by assigning a Gaussian function producing a relatively longer delay time to image data of a compression format requiring a relatively longer time for decoding.

As described above, before the display image processor 170 processes a display image and before the read ahead processor 150 reads image data ahead of time, the transfer function determining unit 140 determines a transfer function and the maximum speed setting unit 144 sets the maximum speed of a display image. In this way, an environment is created in which the processes by the display image processor 170 and the read ahead processor 150 are performed.

The maximum speed setting unit 144 may set the maximum speed of a display image in accordance with the compression format of image data such that the same maximum speed is set for different compression formats. It is necessary in the image processing system 1 that the display image processor 170 be capable of generating a display image by smoothly switching between tile images 38 read ahead by the read ahead processor 150, and, so long as this condition is met, the maximum speed setting unit 144 may set the maximum speed as desired. Similarly, the transfer function determining unit 140 may set the same transfer function for different compression formats. In this case, too, the requirement is that the display image processor 170 is capable of generating a display image by smoothly switching between tile images 38 read ahead by the read ahead processor 150, and, so long as this condition is met, the transfer function determining unit 140 may set a transfer function as desired.

In the above description, it is assumed that the maximum speed of a display image and the transfer function are set in accordance with the compression format of image data. Alternatively, the speed and the function may be set in accordance with the scale. By using a higher compression rate to compress an original image, the volume of compressed data can be reduced and time required for decoding is also reduced accordingly. The fact can be utilized such that, when the header information in a JPEG image format includes information indicating the compression rate, the maximum speed setting unit 144 may set the maximum speed of a display image in accordance with the compression rate read from the header information. Similarly, the transfer function determining unit 140 may set a transfer function in accordance with the compression rate. More specifically, when the compression rate is a predetermined value or larger, the maximum speed setting unit 144 may set the maximum speed of a display image to V1 and the transfer function determining unit 140 may set the Gaussian function 92 as a transfer function. When the compression rate is smaller than the predetermined value, the maximum speed setting unit 144 may set the maximum speed of a display image to V2 (or V3) and the transfer function determining unit 140 may set the Gaussian function 94 (or Gaussian function 96) as a transfer function.

The signal acknowledging unit 122 acknowledges an image modification request signal transmitted from the input device 20. As mentioned, it is assumed in this embodiment for brevity that an image modification request signal is fed from the input device 20. Alternatively, the signal acknowledging unit 122 may generate an image modification request signal upon receipt of an input signal from the input device 20, by determining virtual camera image coordinates (X, Y, SCALE) for each frame, using the maximum speed in the vertical and horizontal directions and the maximum speed in the depth direction as set by the maximum speed setting unit 144. The convolution operation unit 142 generates an image modification direction signal by subjecting the image modification request signal and the transfer function determined by the transfer function determining unit 140 to convolution operation. The read ahead processor 150 performs a read ahead process whereby the processor 150 uses the image modification request signal to read the tile image 38 from the main memory 60 and decode the read image. Further, the display image processor 170 uses the image modification direction signal resulting from the convolution operation to generate a display image.

The modification amount deriving unit 152 in the read ahead processor 150 derives the requested amount of modification of a display image. The amount of modification of a display image comprises the amount of movement per frame in the vertical and horizontal directions and the amount in the depth direction. When, for example, the signal acknowledging unit 122 acknowledges an input signal from the input device 20 but does not generate an image modification request signal, the modification amount deriving unit 152 may refer to the input signal from the input device 20 to derive the amount of modification of a display image, using the maximum speed in the vertical and horizontal directions and the maximum speed in the depth direction as set by the maximum speed setting unit 144. The spatial coordinate determining unit 154 refers to the frame coordinates of the four corners of a previous frame in the hierarchical data structure shown in FIG. 3, to determine the frame coordinates of the four corners of a current frame at the destination of movement defined by the amount of modification thus derived. When the signal acknowledging unit 122 generates an image modification request signal, it is not necessary for the modification amount deriving unit 152 to derive the amount of modification of a display image. The spatial coordinate determining unit 154 receives the image modification request signal from the signal acknowledging unit 122 and determines the frame coordinates of the four corners of a current frame, directly from the image modification request signal.

The decision unit 156 determines whether the tile image 38 for representing the frame image defined by the frame coordinates of the four corners thus determined is already decoded and expanded in the buffer area 72 or the buffer area 74 of the buffer memory 70. The decision unit 156 may refer to the virtual camera image coordinates (X, Y, SCALE) identified by the image modification request signal to determine whether the tile image 38 for representing the frame image is already decoded and expanded in the buffer area 72 or the buffer area 74 of the buffer memory 70. When the image is already located in the buffer area 72 or the buffer area 74, the unit 156 determines whether the scale of the frame image to be displayed goes past the read ahead boundary of the tile image 38. When the tile image 38 for representing the frame image defined by the frame coordinates thus determined is not located in the buffer memory 70 and the requested scale goes past the read ahead boundary, the decision unit 156 directs the image data acquiring unit 160 to acquire the necessary tile image 38. The image data acquiring unit 160 acquires the tile image 38 indicated by the direction from the main memory 60. The decoding unit 162 decodes the acquired image and stores the decoded image in the buffer area 72 or the buffer area 74. This allows the tile image 38 required by the read ahead processor 150 to be expanded in the buffer memory 70 before the display image processor 170 generates a display image.

The modification amount deriving unit 172 in the display image processor 170 refers to the image modification direction signal generated by the convolution operation unit 142 and derives the amount of modification of a display image as indicated by the direction signal. When the image modification request signal represents information identifying virtual camera image coordinates for each frame, the resultant image modification direction signal will also represent information identifying virtual camera image coordinates. As mentioned already, an image modification direction signal is generated by subjecting an image modification request signal and a transfer function to convolution operation and so has a delay commensurate with the transfer function. Accordingly, the read ahead processor 150 completes a process of reading the tile image 38 used to generate a display image, before the display image generating unit 170 generates a display image.

The modification amount deriving unit 172 derives the amount of modification of a display image as the amount of movement per frame in the vertical and horizontal directions and the amount in the depth direction. As mentioned above, when the signal acknowledging unit 122 generates an image modification request signal identifying virtual camera image coordinates (X, Y, SCALE), the convolution operation unit 142 generates a modification direction signal identifying virtual camera image coordinates (X, Y, SCALE). Therefore, it is not necessary for the modification amount deriving unit 172 to derive the amount of modification of a display image. In this case, the spatial coordinate determining unit 174 determines the frame coordinates of the four corners of a current frame, directly from the image modification direction signal. When the modification amount deriving unit 172 calculates the amount of modification of a display image by referring to the input signal from the input device 20, using the maximum speed in the vertical and horizontal directions and the maximum speed in the depth direction as set by the maximum speed setting unit 144, the spatial coordinate determining unit 174 refers to the frame coordinates of the four corners of a previous frame in the hierarchical data structure shown in FIG. 3 to determine the frame coordinates of the four corners of a current frame at the destination of movement defined by the amount of modification thus derived.

The display image generating unit 176 extracts, from the image data stored in the buffer memory 70, data identified by the frame coordinates so as to generate a display image and supply the image thus generated to the frame memory 90. The display image generating unit 176 may generate the display image as a texture image. As described, the image processing apparatus 10 is capable of smoothly enlarging, reducing, or scrolling a display image, by performing a read ahead process and deriving the maximum value of the image modification speed in accordance with the compression format or the compression rate of image data.

In the embodiment described above, the maximum speed of a display image and the transfer function used in convolution operation are determined in accordance with the compression format of image data or the compression rate. Alternatively, the maximum speed and the transfer function may be determined based on other resource information. For example, the resource information identifying unit 134 may identify the memory size of the buffer areas 72 and 74 in the buffer memory 70. Since the memory size of the buffer areas 72 and 74 defines the read ahead boundary in response to a request for modification in the vertical and horizontal directions, the larger the memory size, the larger a time margin for the read ahead process, and, the smaller the memory size, the smaller a time margin for the read ahead process.

Accordingly, the maximum speed setting unit 144 may set the maximum value of the speed of modification of a display image in accordance with the memory size of the buffer areas 72 and 74. For example, the maximum speed setting unit 144 may set the maximum speed to V3 when the memory size of the buffer areas 72 and 74 is less than twice the memory size of the frame memory 90, to V2 when the memory size is equal to or more than twice the memory size of the frame memory 90 and is less than three times the memory size of the frame memory 90, to V1 when the memory size is equal to or more than three times the memory size of the frame memory 90, where V1>V2>V3.

In this process, the transfer function determining unit 140 determines the transfer function used in convolution operation in accordance with the memory size of the buffer areas 72 and 74 identified by the resource information identifying unit 134. Given that the three Gaussian functions shown in FIG. 9 are prepared as transfer functions, the transfer function determining unit 140 determines the Gaussian function 96 as a transfer function when the memory size of the buffer areas 72 and 74 is less than twice the memory size of the frame memory 90, determines the Gaussian function 94 as a transfer function when the memory size is equal to or more than twice the memory size of the frame memory 90 and is less than three times the memory size of the frame memory 90, and determines the Gaussian function 92 as a transfer function when the memory size is equal to or more than three times the memory size of the frame memory 90. Thus, the transfer function determining unit 140 secures time for a read ahead process by assigning a Gaussian function producing a relatively longer delay time when the memory size of the buffer areas 72 and 74 is small.

The maximum speed setting unit 144 may use the compression format identified by the compression format identifying unit 132 and the resource information identified by the resource information identifying unit 134 to derive the maximum speeds based on the respective information. The unit 144 may employ the lower of the maximum speeds thus derived. Similarly, the transfer function determining unit 140 may use the compression format identified by the compression format identifying unit 132 and the resource information identified by the resource information identifying unit 134 to derive transfer functions based on the respective information. The unit 140 may employ the transfer function producing a longer delay time. With this, the image processing device 10 can guarantee stable processing of display images.

The image processing system 1 according to the embodiment is described above as storing the entirety of the compressed hierarchical data. Alternatively, the main memory 60 may store only the necessary compressed hierarchical data, using a read ahead process. In this way, the memory capacity of the main memory 60 can be further reduced.

Before processing an image, the resource information identifying unit 134 identifies the resource used to store compressed hierarchical data. The unit 134 identifies the transfer speed (bus speed) indicating the speed of transfer from the resource used to store compressed hierarchical data to the main memory 60. The hard disk driver 50, a removable recording medium, or a ROM disk will be assumed as resources for storing compressed hierarchical data in the image processing device 10. A removable recording medium is exemplified by a flash memory and is mounted on the recording medium drive 52 so as to allow data transfer at a relatively high speed. Comparing the data transfer speed of the hard disk drive 50 and that of the disk drive 54 for driving a ROM disk, the speed of data transfer from the hard disk drive 50 is higher than that of the disk drive 54. Accordingly, the data transfer speed is highest in the case of the removable recording medium, followed by the hard disk drive 50 and the ROM drive in the stated order.

In this respect, when compressed hierarchical data is sequentially read from a storage device storing the compressed hierarchical data into the main memory 60, the maximum speed setting unit 144 sets the maximum value of the speed of modification of a display image in accordance with the storage device storing the compressed hierarchical data. The maximum speed of a display image may be set in accordance with the speed of data transfer from a removable recording medium, the hard disk drive 50, or a ROM disk. The highest speed of modification is assigned when the compressed data is read from the removable recording medium, and the lowest speed is assigned when the compressed data is read from the ROM disk.

Similarly, the convolution operation units 142 sets a transfer function in accordance with the storage device storing compressed hierarchical data. More specifically, the convolution operation unit 142 employs a transfer function producing the shortest delay time when the compressed data is read from a removable recording medium and employs a transfer function producing the longest delay time when the compressed data is read from a ROM disk.

Figure 10:
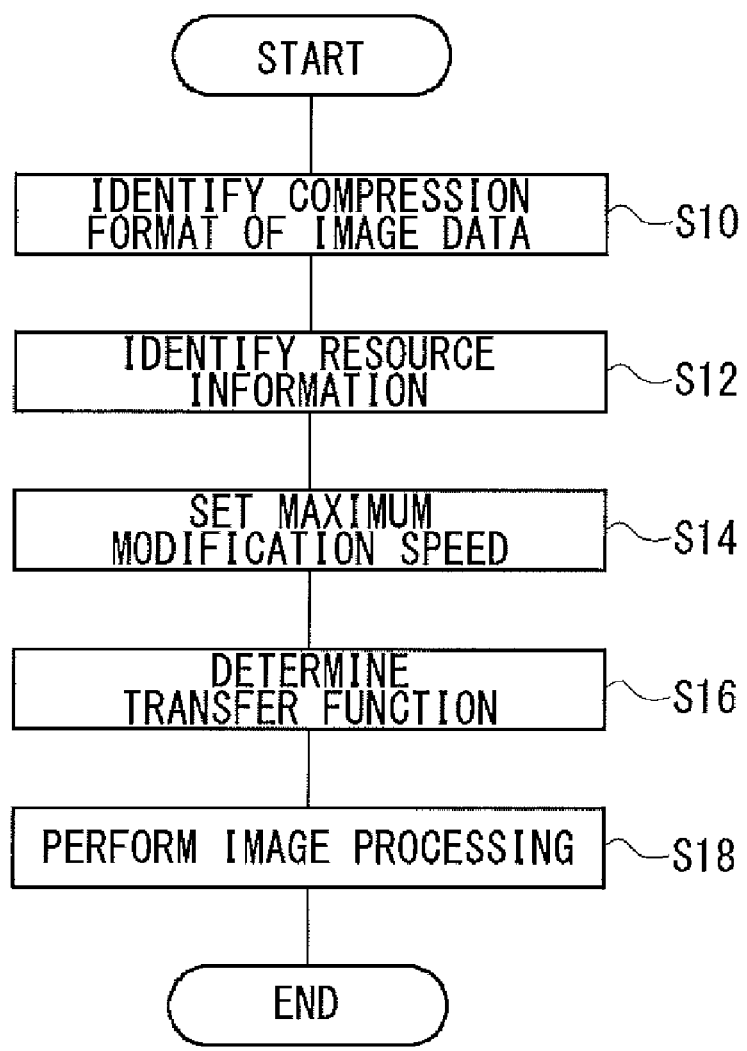
FIG. 10 is a flowchart showing image processing according to the embodiment.

FIG. 10 is a flowchart showing image processing according to the embodiment. First, the compression format identifying unit 132 identifies the compression format of the compressed image data stored in the storage device (S10). Further, the resource identifying unit 134 identifies the resource information of the image processing device 10 (S12). The resource information identified by the resource information identifying unit 134 includes, for example, the transfer speed indicating the speed of transfer from a storage device storing compressed image data to the main memory 60, and the memory size of the buffer memory 70 in which the decoded image data is expanded. The maximum speed setting unit determines the maximum value of the speed of modification of a display image, based on the compression format and/or the resource information thus identified (S14). The transfer function determining unit 140 determines a transfer function used in convolution operation based on the compression format and/or resource information thus identified (S16). When the above processes are completed, the read ahead processor 150 reads image data ahead of time and the display image processor 170 generates a display image. The resultant image is displayed on the display (S18).

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, the maximum speed setting unit 144 may set the maximum value of the speed in the direction of reducing a display image to be smaller than the maximum value of the speed in the direction of enlarging a display image. Provided that, for example, reduction in the resolution of a display image, occurring while the image is being enlarged, is permitted, the display image generating unit 176 may generate a display image based on the image data expanded in the buffer memory 70. Meanwhile, while the image is being reduced, the displayed data may extend beyond the image data expanded in the buffer memory 70. Therefore, it is preferable to ensure that a read ahead process is performed. Accordingly, a read ahead process in the direction of reduction may be ensured by setting the maximum speed in the direction of reducing a display image to be smaller than the maximum speed in the direction of enlarging. Similarly, the transfer function determining unit 140 may set the delay time produced by the transfer function used when a display image is reduced to be larger than the delay time produced by the transfer function used when a display image is enlarged.

Attribute information designating the maximum speed and transfer function may be assigned to the tile images forming the hierarchical data. The attribute information of the tile images is associated with the identification information of the tile images and stored in the table apart from the hierarchical data. In this case, the signal processing unit 120 is provided with the function of identifying the tile image 38 used to generate a display image. Upon identifying the tile image 38, the signal processing unit 120 reads the attribute information of the tile image 38 from the table, extracts the maximum speed and transfer function identified by the attribute information, and sets the speed and function accordingly. When, for example, a provider of an image intends to change a display image gradually in a given layer, image display suited to the intention of the provider of the image can be achieved by including, in the attribute information, setting information designating a small maximum speed and setting information designating a transfer function producing a long delay time. Attribute information may be assigned to a layer instead of the tile images.

The image processing device 10 according to the embodiment is described as processing a single set of hierarchical data defined in a local coordinate system. Alternatively, the device 10 may process a plurality of sets of hierarchical data. By associating a plurality of hierarchical data with each other, various applications can be achieved.

Figure 11:
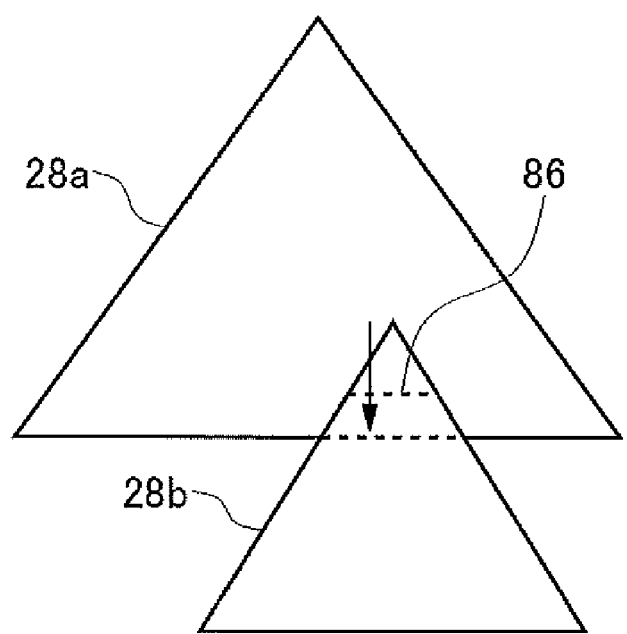
FIG. 11 illustrates a read ahead process performed when a plurality of sets of hierarchical data associated with each other are provided.

FIG. 11 illustrates a read ahead process performed when a plurality of sets of hierarchical data 28a and 28b associated with each other are provided. It will be assumed by way of example that the hierarchical data 28a of an application comprises image data for a world map, and the hierarchical data 28b comprises detailed image data for a Japanese map included in the world map. Referring to the figure, an overlap exists between the triangle representing the hierarchical data 28a and the triangle representing the hierarchical data 28b. When a display image is enlarged in the overlap area (i.e., when an image modification request signal requests image modification in the direction of arrow), switching from the hierarchical data 28a to the hierarchical data 28b takes place at a switching boundary 86. Conversely, when a display image is reduced, switching from the hierarchical data 28b to the hierarchical data 28a takes place at the switching boundary 86.

The initial image of this application represents the entirety of the world map in Mercator projection on the display device 12. The initial map comprises image data of the hierarchical data 28a. When the user keeps entering a request to enlarge the Japanese map included in the world map via the input device 20, the image processing device 10 uses the hierarchical data 28a to enlarge the Japanese map, switching to the hierarchical data 28b along the way and continuing to enlarge the detailed image of the Japanese map. To enlarge a display image, the image modification request signal is generated in the direction of arrow in the figure. The process of reading hierarchical data 28b ahead of time is initiated when the image modification request signal goes past the read ahead boundary (not shown) located before of the switching boundary 86 (i.e., above the switching boundary 86 in the figure). Meanwhile, to reduce a display image, the image modification request signal is generated in a direction opposite to the direction of arrow in the figure. The process of reading hierarchical data 28a ahead of time is initiated when the image modification request signal goes past the read ahead boundary (not shown) ahead the switching boundary 86 (i.e., below the switching boundary 86 in the figure).

When the hierarchical data 28a and the hierarchical data 28b share the same coordinate system, i.e., when a single global coordinate system is used to generate the hierarchical data 28a and the hierarchical data 28b, the image modification request signal will represent a signal requesting the modification of virtual camera image coordinates (X, Y, SCALE). Therefore, when the coordinate system is shared, the virtual camera can be assumed to make a continuous movement even when the hierarchical data is switched.

Figure 12A:
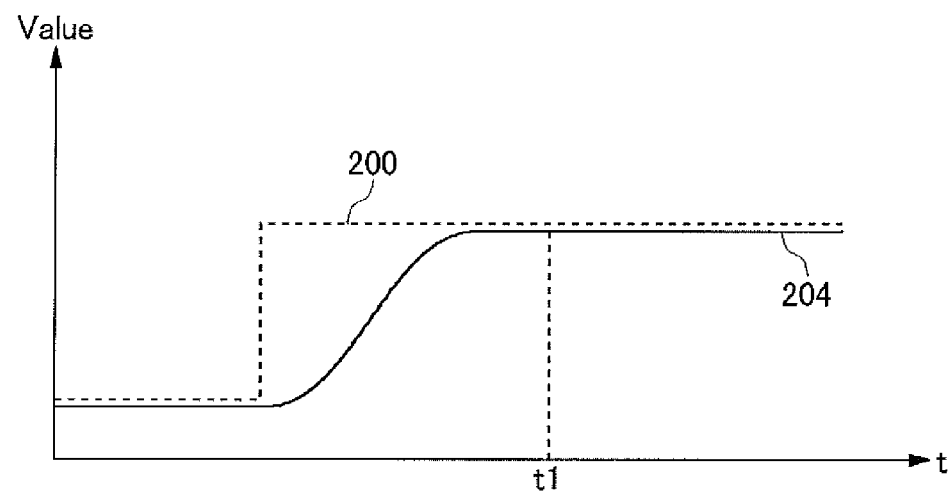
FIG. 12A shows an image modification direction signal occurring when the hierarchical data is switched in the global coordinate system.

FIG. 12A shows an image modification direction signal 204 occurring when the hierarchical data is switched in the global coordinate system at time t1. Even when the hierarchical data 28a is switched to hierarchical data 28b, or when the hierarchical data 28b is switched to the hierarchical data 28a, the virtual camera makes a movement in a single coordinate system so long as both sets of hierarchical data are defined in a common coordinate system. The result of convolution by the convolution operation unit 142 is inherited as it is irrespective of the switching of hierarchical data.

However, when a common global coordinate system is used to represent the hierarchical data 28a and the hierarchical data 28b in the exemplary application described above, the volume of computation required to maintain the positional precision of an enlarged image will be enormous. More specifically, when a crossing in a certain town in Japan, selected from the world map, is to be displayed, the global coordinate system should represent the crossing using the coordinates that define the world map. This will result in too large a number of digits of the coordinate value in order to ensure high positional precision of the crossing, requiring an enormous amount of computation.

In this respect, the hierarchical data 28a and the hierarchical data 28b according to the embodiment are represented in different local coordinate systems. Advantageously, this will reduce the number of digits to represent the coordinates of the hierarchical data as compared with the case of the global coordinate system, resulting in reduction in the amount of computation.

Figure 12B:
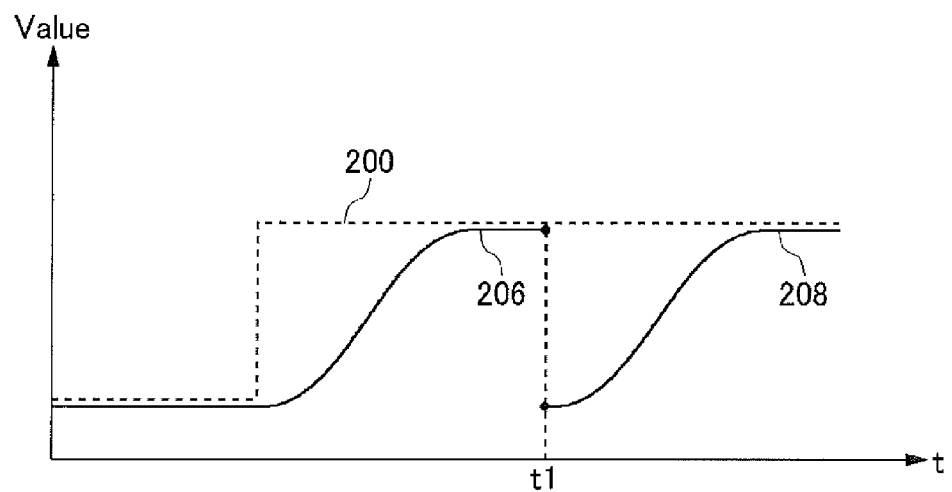
FIG. 12B shows an image modification direction signal occurring when the hierarchical data is switched in two local coordinate systems.

FIG. 12B shows image modification direction signals 206 and 208 occurring when the hierarchical data is switched at time t1 between two local coordinate systems. It will be assumed by way of example that the hierarchical data 28a is switched to the hierarchical data 28b while a display image is being enlarged. The following description also applies to the case where the hierarchical data 28b is switched to the hierarchical data 28a while the display image is being reduced. The image modification request signal 200 is as shown in FIG. 12A.

The image modification direction signal 206 represents a request for moving the virtual camera in the hierarchical data 28a and is identical to the image modification direction signal 204 of FIG. 12A until time t1. Meanwhile, when the tile image used to generate a display image is switched from the image of the hierarchical data 28a to that of the hierarchical data 28b defined in a different coordinate system, continuity of the virtual camera image coordinates (X, Y, SCALE) is lost. For example, the convolution operation unit 142 determines that continuity of the virtual camera image coordinates is lost when the distance between virtual camera image coordinates for two successive frames exceed the maximum distance that could occur between frames under the maximum speed of a display image. In this case, the convolution operation unit 142 determines that the image modification request signal 200 after time t1 is generated newly for the hierarchical data 28b. Thus, the unit 142 interprets the image modification request signal at time t1 as an initial input value and subjects the signal at time t1 and the transfer function to convolution operation, thereby generating the image modification direction signal 208.

The compression format identifying unit 132 identifies the compression format of the hierarchical data 28b read ahead of time and stored in the main memory 60, before the convolution operation. The maximum speed setting unit 144 sets the maximum value of the speed of modification of a display image in accordance with the compression format of image data identified by the compression format identifying unit 132. The transfer function determining unit 140 determines the transfer function used in convolution operation in accordance with the compression format of image data identified by the compression format identifying unit 132. It is preferable that these processes be performed when the hierarchical data 28b are read ahead of time and be completed at time t1. The image modification request signal 200 after t1 may be generated using the maximum speed. When the hierarchical data 28a and the hierarchical data 28b are of the same compression format, the maximum speed and the transfer function determined for the hierarchical data 28a may also be applied to the hierarchical data 28b. In the example shown in FIG. 12B, it is assumed that the hierarchical data 28a and 28b are of the same compression format.

The image modification direction signal 208 shown in FIG. 12B will not allow inheriting the virtual camera coordinates at time t1. For example, constant-speed magnification of a map image initially showing the entirety of the world will be temporarily stopped at time t1, when the hierarchical data is switched, and then the map is gradually enlarged and displayed accordingly. The user recognizes that the image has been switched for some reason when viewing a discontinuous display image. In some applications, it may be preferable to make discontinuity visible to the user. In applications where the user is first shown the world map and then shown continuously enlarged views of a crossing in a town in Japan, however, it is not preferable that continuity is lost.

This is addressed in this embodiment by allowing the convolution operation unit 142 to define a connection between tile images based on the coordinate systems of the two sets of hierarchical data, when the display image generating unit 176 switches from the tile image used to generate a display image to the tile image from the hierarchical data 28 defined in another coordinate system. More specifically, the convolution operation unit 142 converts the virtual camera image coordinates in the hierarchical data 28a before switching into the virtual camera image coordinates in the hierarchical data 28b after switching, ensuring that the virtual camera image coordinates before time t1 can be inherited as if the coordinates were virtual camera image coordinates in the hierarchical data 28b. By converting the virtual camera image coordinates in the hierarchical data 28a before time t1 into virtual camera image coordinates in the hierarchical data 28b, the convolution operation unit 142 can handle the coordinates as continuous virtual camera image coordinates and can generate the image modification direction signal 204 shown in FIG. 12A by subjecting the image modification request signal 200 and the transfer function to convolution operation. In other words, the image modification direction signal in the same coordinate system can be generated, by converting the image modification request signal before time t1 into the image modification request signal in the hierarchical data 28b used after time t1, and using the image modification request signal thus obtained by conversion.

For example, in the example of Gaussian functions shown in FIG. 9, the maximum number of frames delayed is 32, which is introduced by the Gaussian function 96. Therefore, the convolution operation unit 142 may subject the virtual camera coordinates for 32 frames before time ti1 to coordinate conversion. This will allow the virtual camera image coordinates before time t1 to be properly inherited after time t1, regardless of which Gaussian function is selected as a transfer function.

Coordinate conversion is performed by using the relative spatial position of the hierarchical data 28a and the hierarchical data 28b shown in FIG. 11. The hierarchical data 28a and the hierarchical data 28b are represented in different coordinate systems. However, the data partly overlap in the virtual three-dimensional space. For this reason, a coordinate in one system can be uniquely converted into a coordinate in another. Therefore, a known method such as a coordinate conversion expression can be used.

In some applications, it is not preferable to move the virtual camera continuously when the hierarchical data is switched. For example, where the hierarchical data 28a comprises image data for a shopping mall, in which, for example, a plurality of shops are located but the doors of the shops are closed and the interior of the shops cannot be seen, and where the hierarchical data 28b comprises image data for store shelves in a given shop, the shopping mall and the interior of the shop are not spatially continuous. In such a case, it is preferable to make display images discontinuous intentionally. It is therefore preferable to generate the image modification direction signal 208 shown in FIG. 12B when the hierarchical data is switched. Thus, the convolution operation unit 142 may maintain attribute information, indicating whether the virtual camera should be continuously moved when the hierarchical data is switched, in association with the two sets of hierarchical data. The convolution operation unit 142 refers to the attribute information when the hierarchical data is switched so as to determine whether coordinate conversion should be performed.

What is claimed is:

1. An image processing device for displaying an image on a display, comprising:
    a storage device operative to store image data including at least one compressed tile image for each of different resolutions;
    an identifying unit operative to identify the compression format of the image data stored in the storage device;
    a transfer function determining unit operative to determine a transfer function in accordance with the compression format of the tile image thus identified;
    an acknowledging unit operative to acknowledge a modification request signal requesting modification of a display image displayed on the display;
    a convolution operation unit operative to subject the modification request signal and the transfer function thus determined to convolution operation so as to generate a modification direction signal;
    a read ahead processor operative to read a tile image from the storage device using the modification request signal and decode the image thus read; and
    a display image processor operative to generate a display image using the modification direction signal.

2. The image processing device according to claim 1, further comprising:
    a maximum speed setting unit operative to set a maximum value of a speed with which to modify a display image in accordance with the identified compression format of the image data.

3. The image processing device according to claim 2, wherein
    the maximum speed setting unit ensures that the maximum value of the speed in the direction reducing a display image is smaller than the maximum value of the speed in the direction enlarging.

4. The image processing device according to claim 1, wherein
the transfer function determining unit determines a transfer function based on attribution information of the tile image.

5. The image processing device according to claim 1, wherein
the storage device stores a plurality of sets of image data defined in different coordinate systems, and
when the display image processor switches a tile image used to generate a display image to a tile image in the image data defined in another coordinate system, the convolution operation unit converts a modification request signal before switching into a modification request signal addressing the image data in said another coordinate system so as to generate a modification direction signal using the modification request signal obtained by the conversion.

6. An apparatus, comprising:
a micro-processing system executing a computer program, which causes the system to perform actions, comprising:
identifying a compression format of image data stored in a storage device and including at least one tile image for each of different resolutions;
determining a transfer function in accordance with the compression format of the tile image thus identified;
acknowledging a modification request signal requesting modification of a display image displayed on the display;
subjecting the modification request signal and the transfer function thus determined to convolution operation so as to generate a modification direction signal;
reading a tile image from the storage device using the modification request signal and decode the image thus read; and
generating a display image using the modification direction signal.

7. A non-transitory, computer readable recording medium encoded with a program, comprising:
a module operative to identify a compression format of image data stored in a storage device and including at least one tile image for each of different resolutions;
a module operative to determine a transfer function in accordance with the compression format of the tile image thus identified;
a module operative to acknowledge a modification request signal requesting modification of a display image displayed on the display;
a module operative to subject the modification request signal and the transfer function thus determined to convolution operation so as to generate a modification direction signal;
a module operative to read a tile image from the storage device using the modification request signal and decode the image thus read; and
a display image processor operative to generate a display image using the modification direction signal.

* * * * *